United States Patent [19]
Crane

[11] Patent Number: 5,661,549
[45] Date of Patent: Aug. 26, 1997

[54] VARIABLE SIZED AND PROPORTIONED WINDOW FOR CROPPING PHOTOGRAPHS

[76] Inventor: Steven Crane, 6304 Woodstream Ct., Dallas, Tex. 75240

[21] Appl. No.: 500,188

[22] Filed: Jul. 10, 1995

[51] Int. Cl.⁶ .................................................. G03B 27/28
[52] U.S. Cl. .................................................. 355/126; 355/74
[58] Field of Search ............... 355/126, 74; 248/448, 248/449, 450

[56] References Cited

U.S. PATENT DOCUMENTS

| | | | |
|---|---|---|---|
| 1,072,215 | 8/1913 | Wilson et al. | 355/126 |
| 1,116,888 | 11/1914 | Heyn | 355/126 |
| 2,246,920 | 6/1941 | Kromholz | 355/74 |
| 3,203,334 | 8/1965 | Druhe | 355/126 |
| 3,709,591 | 1/1973 | Alzmann | 355/126 |

*Primary Examiner*—Joan H. Pendegrass
*Assistant Examiner*—Quana Grainger
*Attorney, Agent, or Firm*—Crutsinger & Booth

[57] ABSTRACT

A device is provided for mounting and/or cropping photographs and negatives thereof to variable dimensions. The device is comprised of a sheath with a rectangular opening therein which defines the maximum size of a cropping window. A pair of panels, each having an aperture therein are slideably disposed in the sleeve. As the panels are moved between open and closed positions, the apertures cooperate with the rectangular opening to define variable sizes of the cropping window.

1 Claim, 3 Drawing Sheets

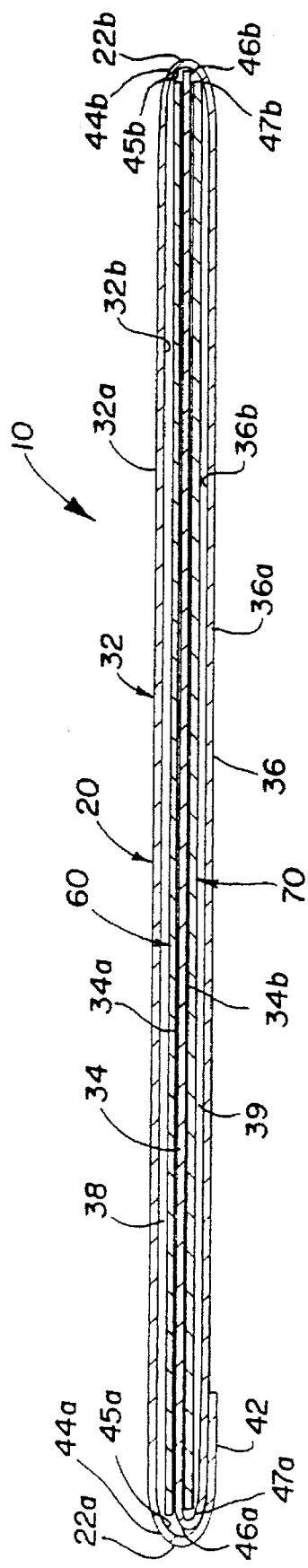
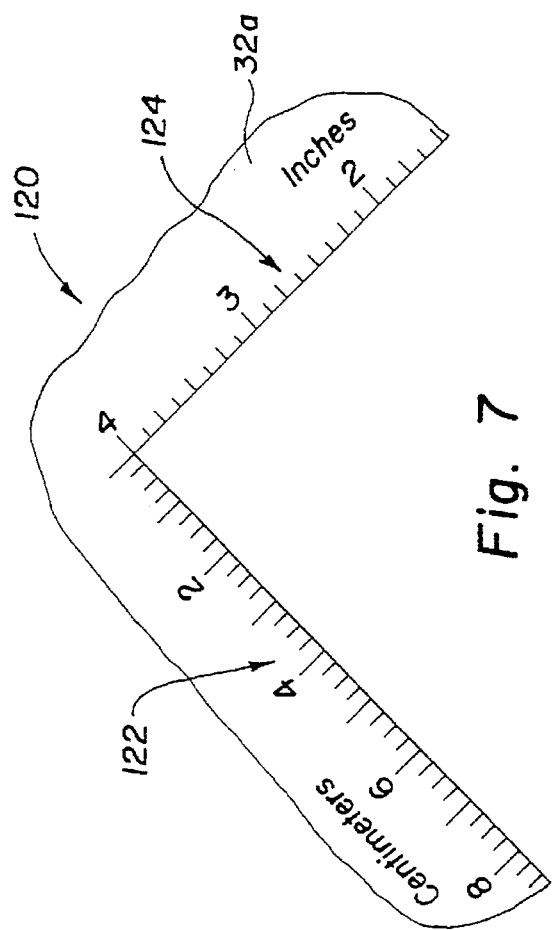
Fig. 2
Fig. 7

VARIABLE SIZED AND PROPORTIONED WINDOW FOR CROPPING PHOTOGRAPHS

FIELD OF THE INVENTION

A device is provided for marking and/or cropping photographs and negatives to variable dimensions. More particularly, a plate and slidable panels attached thereto have apertures therein that cooperate to define a cropping window which is variable to any size square or rectangle up to a fixed maximum size.

BACKGROUND OF THE INVENTION

The process of selecting a portion of a photograph for enlargement is known as cropping. The selected portion is typically enlarged to a standard size, for example, eight by ten inches. Generally, the selected portion must be proportioned the same as the desired size of the enlargement. The term proportion refers to the ratio of the length of the enlargement or selected portion to its width. Thus, an eight by ten inch enlargement can be made from various sized selected portions such as four by five, two by two-and-a half, etc.

It is well known to crop a photograph with two individual L-shaped sheets which can be positioned relative to each other to form a rectangular mask. The two plates are placed upon the photograph and each is shifted in relative position until the desired size and shape is obtained. The photograph is then outlined or marked along the inner edges of the mask. The accuracy of this technique in maintaining a desired proportion is approximate at best and is dependent upon the skill and care of the operator. This cropping technique is thus relatively inaccurate and time-consuming.

U.S. Pat. No. 2,246,920 to Kromholz uses a stationary mask with a rectangular window and a moving mask with angled cutting edges. The moving mask is mounted in tracks to guide the sliding of the moving mask relative to the stationary mask. A photograph is placed in the window of the stationary mask. The moving mask is positioned in the tracks to overlap the photograph. Sliding the mask along the tracks over the stationary mask in or parallel to a line diagonal to the apices of an angle of the window of the stationary mask that is opposed to the angle of the cutting edges of the moving mask will alter the size without changing the proportional dimensions of the unmasked area relative to the original area of the window. Thus, while guiding the "L" shaped cutting edges of the moving mask, this device is limited in its ability to crop selected portions of photographs or negatives with separately and independently variable length and width to crop to any desired proportion of length and width.

In a similar manner, U.S. Pat. No. 3,709,591 to Alzman discloses a sheath having two opposite open ends and a centerline intersecting the open ends. A slide is located within the sheath and is of a size and shape complementary to that of the sheath. A centerline of the slide is coincident with the sheath centerline. The slide is adapted to move within the sheath while maintaining coincident centerlines. The sheath and slide each have an identical but irregular quadrilateral aperture therethrough with two diagonally opposed corners located on the centerlines. The two aperture sides forming one of the corners of the aperture are of a different proportion (i.e., different length) than the opposing two aperture sides forming the other corner. The slide aperture is then rotated 180 degrees within the sheath to locate identically proportioned sides of the sheath and slide opposite each other on the coincident centerlines. In operation, the aperture is placed over the selected portion of a photograph and the particular proportion of the selected area is chosen by adjusting the area of the aperture by adjusting the position of the slide one way or the other. If the other cropping proportion is desired instead, then the slide is adjusted in the opposite direction. This device is capable of cropping in two, but only two, different proportions of length to width. Thus, this device is limited in its ability to crop selected portions of photographs or negatives with separately and independently variable length and width to crop to any desired proportion of length and width.

Therefore, a need exists for a simple, easy-to-use device which can be quickly and accurately adjusted to provide any desired size and proportion of window.

SUMMARY OF THE INVENTION

In accordance with the present invention, a device is provided which has a variable sized window for cropping photographs, negatives and the like. A sheet or plate has a rectangular opening therein, and two sides of the opening which meet at a right angle define the first and second straight edges of the cropping window. At lease one guide channel formed on an edge of the plate operably connects two panels to the plate. The guide channel can be defined, for example, by a sheath, track, groove, ledge, or any other suitable channel shaped structure. A first panel defines the third straight edge of the cropping window, and a second panel defines the fourth straight edge of the cropping window.

The guide channel allows the first and second panels to slide relative to the plate and to each other while restricting them to reciprocal movement along a single axis oriented in a non-orthogonal relationship with at least one of the straight edges. The panels are slidable between an open position and a closed position. In the open position the third and fourth straight edges lie outside of the rectangular opening. Thus, in the open position the cropping window is defined by the rectangular opening in the plate and is at its maximum size.

As the panels are moved towards the closed position, the third and fourth straight edges cross the rectangular opening at right angles to each other to progressively provide smaller sized cropping windows. The third straight edge is maintained in a parallel relationship with the first straight edge, and the fourth straight edge is maintained in a parallel relationship with the second straight edge. Thus, between the open and closed positions the cropping window is defined by the first and second straight edges in the rectangular opening and the third and fourth straight edges on the panels.

The panels may be operated singly or simultaneously. Since the straight edges are maintained in the parallel and perpendicular orientations, movement of the panels between the open and the closed positions adjusts the cropping window to variable sizes and proportions of right angle quadrilaterals. The size of the cropping window at any position is displayed by linear scales affixed to exterior surfaces of the plate.

BRIEF DESCRIPTION OF THE DRAWING

The accompanying drawing is incorporated into and forms a part of the specification to illustrate at least one presently most preferred embodiment of the present invention. The figures of the drawing together with the written description serve to explain the principles of the invention. The drawing is only for the purpose of illustrating examples of how the invention can be made and used and is not to be construed as limiting the invention to only the illustrated and described examples. The various advantages and features of the present invention will be apparent from consideration of the written description with the drawing, wherein:

FIG. 2 is a section view taken along lines 2—2 of FIG. 1;

FIG. 7 is an enlarged view of a linear scale for use in measuring the cropping window defined by the positioning of the panels in a device according to the present invention.

DESCRIPTION OF A PREFERRED EMBODIMENT

Figure 1:
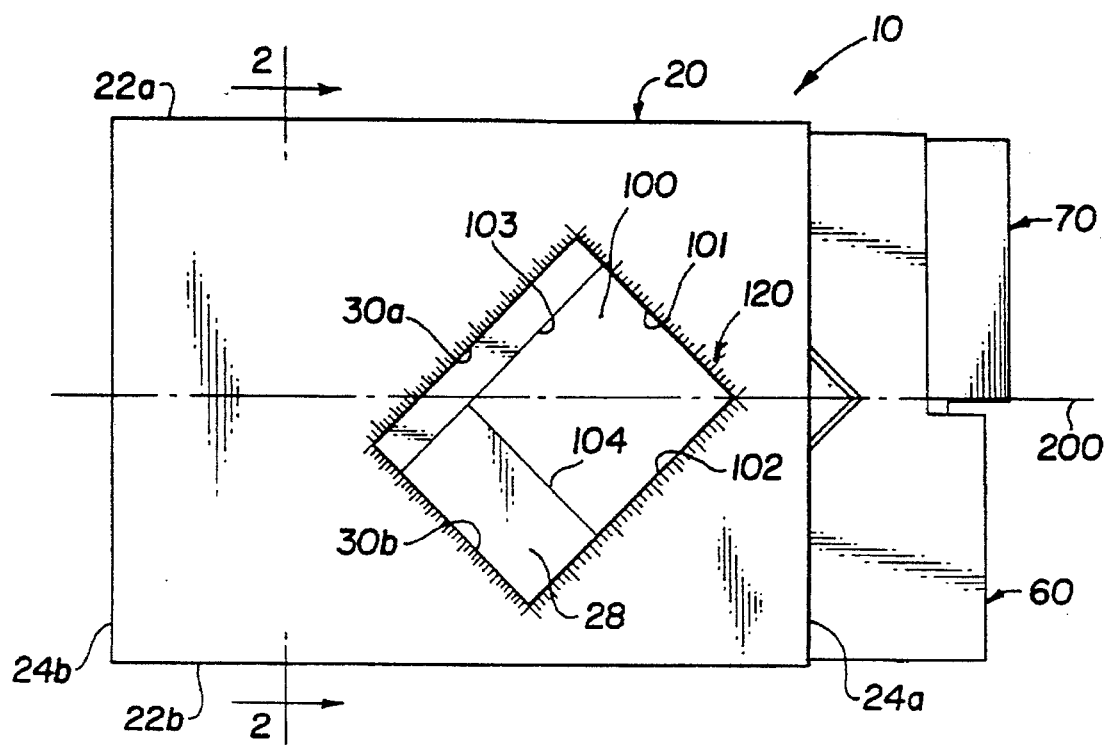
FIG. 1 is a plan view of a cropping device according to a preferred embodiment of the invention, wherein the plate and guide channels are in the form of a sheath and showing the first and second panels positioned in the sheath between the open and closed positions.

Referring to the drawing wherein like reference characters designate like or corresponding parts throughout the various figures, there is illustrated in FIG. 1 a cropping device according to a preferred embodiment of the invention which is designated generally by the reference numeral 10. The cropping device 10 comprises a sheath 20, a first panel 60, and a second panel 70. Sheath 20 includes first and second straight edges 101 and 102, respectively, first panel 60 includes third straight edge 103, and second panel 70 includes fourth straight edge 104. As hereinafter described in detail, these straight edges 101, 102, 103, and 104 cooperate to define a variable sized cropping window 100.

The sheath 20 and panels 60 and 70 are made from any sheet material that is sufficiently rigid to retain a planar shape. A preferred material for both the sheath 20 and panels 60 and 70 is a paper product such as cardboard or poster board. Plastics and metals can also be used.

As shown in FIG. 1, sheath 20 is preferably rectangular in shape, as defined by long sides 22a and 22b and short sides 24a and 24b. The sheath 20 has a central axis 200 that is parallel to the long sides 22a and 22b. The sheath 20 has an aperture 28 formed therethrough, which is defined by edges 101, 102, 30a, and 30b. As will hereinafter be described, a picture, negative, or the like can be positioned in the aperture 28 for cropping to any desired proportion of length and width dimensions as defined by cropping window 100.

FIG. 2 is a cross-sectional view of the cropping device shown in FIG. 1 taken along line 2—2. The sheath 20 is formed from at least one sheet member and according to a presently most preferred embodiment of the invention shown in FIG. 2, the sheath 20 is preferably formed to include an upper sheet 32, a middle sheet 34, and a lower sheet 36. The upper, middle, and lower sheets 32, 34, and 36, respectively, are each preferably rectangular in shape. Upper sheet 32 and lower sheet 36 are disposed on opposite sides of the middle sheet 34. It is to be understood, however, that the sheath 20 can be formed with greater or fewer sheets and with different geometries if desired. Upper sheet 32 has an exterior surface 32a and interior surface 32b. Middle sheet 34 has an upper surface 34a and a lower surface 34b. Lower sheet 36 has exterior surface 36a and interior surface 36b.

Interior surface 32b of upper sheet 32 and upper surface 34a of middle sheet 34 define an upper clearance 38. Interior surface 36b of lower sheet 36 and lower surface 34b of middle sheet 34 define a lower clearance 39.

In the presently most preferred embodiment, upper sheet 32 and lower sheet 36 are secured together at long edges 22a and 22b. Middle sheet 34 is disposed between and secured to at least one of the sheets 32 or 34. The upper, middle, and lower sheets 32, 34, and 36, respectively, are secured together using any suitable means known to those skilled in the art. However, the upper, middle, and lower sheets 32, 34, and 36 are not secured to each other along their short edges, thereby permitting the slidable insertion of first and second panels 60 and 70 into clearances 38 and 39, respectively.

For example, according to the presently most preferred embodiment of the invention shown in FIG. 2, sheath 20 is preferably integrally formed by folding or bending a single piece of sheet material into three sections to form the individual sheets 32, 34, and 36. The folds are located such that upper sheet 32 is initially larger than middle sheet 34 or lower sheet 36, and the extra material is wrapped around long edge 22a to form a fastening strip 42. The fastening strip 42 is secured to the exterior surface 36a of the lower sheet 36 using any conventional means, such as an adhesive.

The folded material adjacent long edges 22a and 22b that depends from the upper sheet 32 is curved or angled to form guide channel portions 44a and 44b having guide surfaces 45a and 45b, respectively. The folded material adjacent long edges 22a and 22b that depends from the lower sheet 36 is curved or angled to form guide channel portions 46a and 46b having guide surfaces 47a and 47b, respectively. Middle sheet 34 is disposed between and secured along a bend in the sheet material to lower sheet 34 adjacent long edge 22a. The opposite edge of middle sheet 34 is merely trapped between guide surfaces 45b and 47b.

First panel 60 is shown installed in clearance 38 and second panel 70 is shown installed in clearance 39. Panels 60 and 70 are sized to approximate the interior dimensions of clearances 38 and 39, respectively. The guide surfaces 45a and 45b allows first panel 60 to slide relative to the sheath 20 (in the direction of axis 200 shown in FIG. 1). The guide surfaces 47a and 47b allow second panel 70 to slide relative to the sheath 20 (in the direction of axis 200 shown in FIG. 1). First and second panels 60 and 70 can slide independently of each other. The guide surfaces restrict each of the panels 60 and 70 to reciprocal movement along one direction within the sheath. A slight amount of clearance is provided between the inside surfaces of the sheath 20 and each of the panels 60 and 70 to permit relative reciprocal movement between the sheath 20, first panel 60, and second panel 70 along axis 200. The guide surfaces 45a and 45b restrict the first panel 60 from moving in any direction except along axis 200; similarly, guide surfaces 47a and 47b restrict the second panel 70 from moving in any direction except along axis 200.

The guide channel members 44a, 44b, 46a, and 46b are shown for illustrative purposes only. Alternative embodiments can include any guide means structure which includes at least one surface to facilitate sliding one or more panels relative to the sheath and to each other. For example, upper and lower sheets 32 and 36 can be secured together using brads, pins, rivets, or the like, which can also be used to restrict and guide the panels 60 and 70. Other guide means can include a ledge or wall abutting the sides of the panels, and sheaths and panels formed with interlocking tongue and groove structures.

Interior surfaces 32b and 36b of upper and lower sheets 32 and 36, respectively, bear against the respective panels 60 and 70 installed in the clearances 38 and 39, respectively, and press them against the middle sheet 34. This small pressure creates a nominal friction force on the panels 60 and 70, which slightly inhibits their movement within the sheath. However, the nominal friction force is easily overcome by the user when the panels are repositioned relative to the sheath 20.

Figure 3:
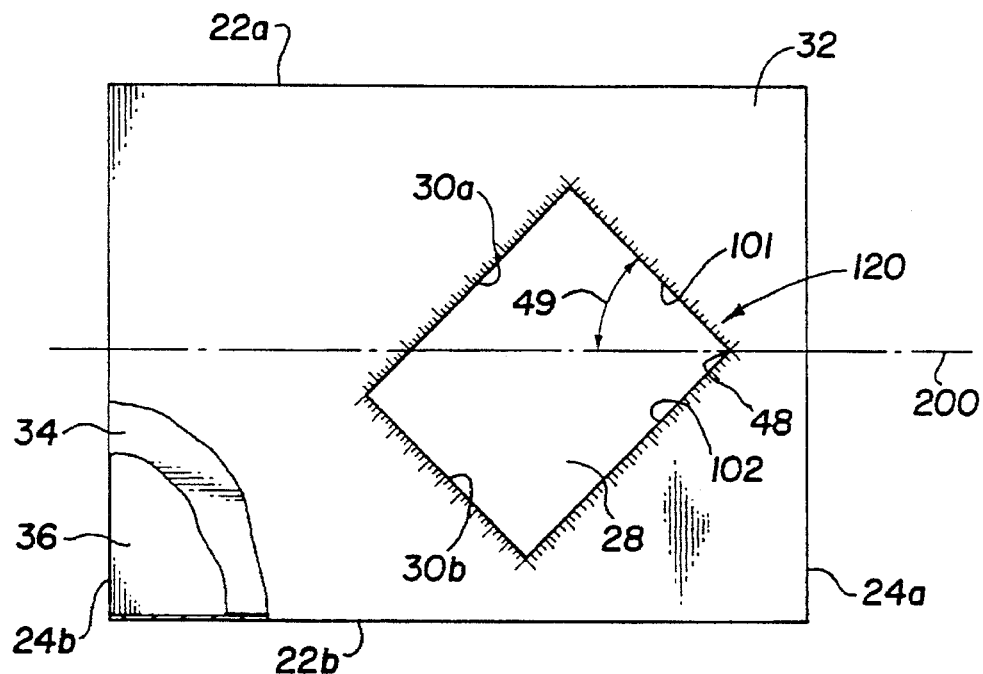
FIG. 3 is a plan view of a sheet member for forming the sheath.

Referring now to FIG. 3, the upper sheet 32 of the sheath 20 is shown in detail. (Upper sheet 32 is representative of one or more similar sheets, such as middle sheet 34 and lower sheet 36 shown in FIG. 2.) Sheet 32 has a rectangular cutout therein corresponding to the aperture 28, and the other sheets 34 and 36 have identical rectangular cutouts. When the sheets 32, 34, and 36 are assembled as shown in FIG. 2, the overlapping cutouts of the sheets are aligned to form an overlapping rectangular cutout corresponding to the aperture 28 extending entirely through the sheath 20. The rectangular aperture 28 is defined by the first straight edge 101, a second straight edge 102, and edges 30a and 30b. First and second straight edges 101 and 102 intersect at point 48 to form two edges of the cropping window 100. Edges 30a and 30b coincide with the edges 104 and 103, respectively, of the cropping window 100 only when the first and second panels 60 and 70 are in an open position and the cropping window 100 is at its maximum size. The aperture 28 is positioned in the sheath 20 with edge 101 oriented at an angle 49 from the axis 200 which extends between short sides 24a and 24b through point 48. The angle 49 positions edge 101 in a non-orthogonal relationship with the axis 200, and in the presently preferred embodiment the angle 49 measures approximately slightly less than 45 degrees.

Figures 4, 5:
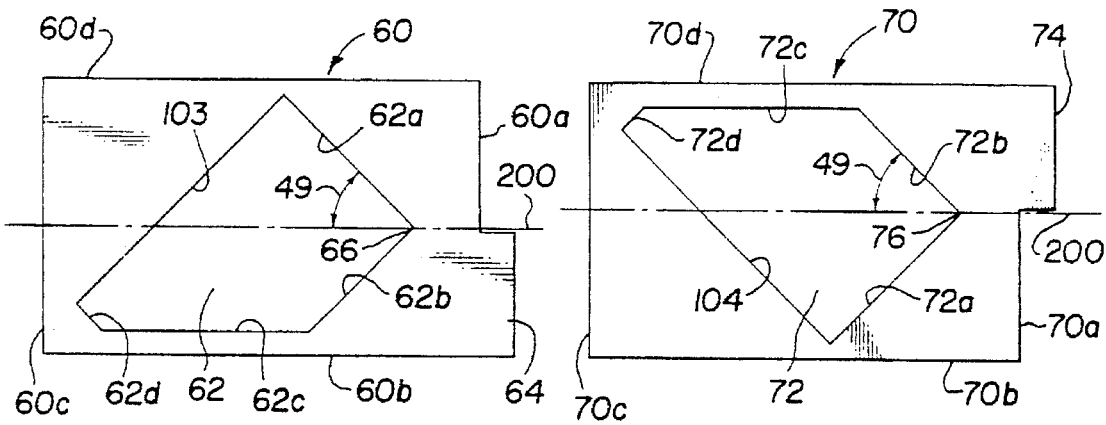
FIG. 4 is a plan view of the first panel.
FIG. 5 is a plan view of the second panel.

First panel 60 is shown in FIG. 4 with all other elements of the cropping device 10 removed for clarity. In the preferred embodiment, panel 60 is substantially rectangular and includes sides 60a, 60b, 60c, and 60d. An aperture 62 extends entirely through the panel 60 and is defined by third straight edge 103 along with edges 62a, 62b, 62c, and 62d. The straight edge 103 of aperture 62 is the same as the third straight edge 103 of cropping window 100 when panel 60 is positioned in sheath 20. Edges 62b and 62c are the same length as straight edges 101 and 102, respectively, on sheath 20, and form a right angle at point 66 which is located on axis 200. Straight edge 103 is parallel to edge 62b. Edge 62a is oriented at angle 49 from axis 200 (similar to edge 101 in sheath 20). A tab 64 extends from side 60d. The tab 64 is gripped by the user when positioning the panel 60 in the cropping device. Other gripping aids might also be used, such as holes, slots, knurled surfaces, raised beads, or the like.

Second panel 70 is shown in FIG. 5 with all other elements of the cropping device 10 removed for clarity. In the preferred embodiment, panel 70 is substantially rectangular and includes sides 70a, 70b, 70c, and 70d. An aperture 72 extends entirely through the panel and is defined by straight edge 104 along with edges 72a, 72b, 72c, and 72d. The straight edge 104 of aperture 67 is the same as the third straight edge 104 of cropping window 100 when panel 70 is positioned in sheath 20. Edges 72a and 72b are the same length as straight edges 101 and 102, respectively, on sheath 20, and form a right angle at point 76 which is located on axis 200. Straight edge 104 is parallel with edge 72b and extends from the end of edge 72a opposite from edge 72b. Edge 72b is oriented at angle 49 from axis 200 (similar to edge 101 in sheath 20). A tab 74 extends from side 70d. As discussed hereinafter, the tab 74 is gripped by the user when positioning the panel. Other gripping aids might also be used, such as holes, slots, knurled surfaces, raised beads, or the like.

Figure 6:
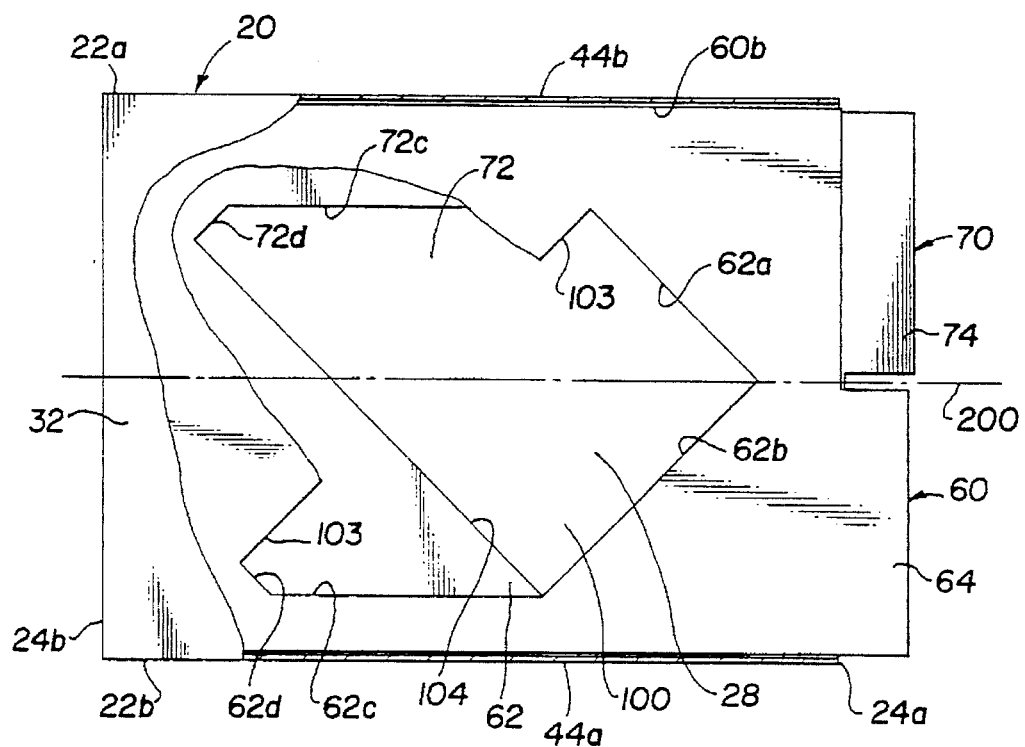
FIG. 6 is plan view of a cropping device according to the preferred embodiment of the invention, with portions of the upper surface broken away to show the orientation of the first and second panels in the open position.

The first and second panels 60 and 70 are shown installed in the open position in FIG. 6, where portions of the upper sheet 32 and the entire middle sheet 34 are removed for clarity of the drawing. Channel members 44a and 44b position the first panel 60 for slidable reciprocating movement along the direction of axis 200. Similarly, channel member 46a (and 46b shown in FIG. 2) assist in positioning the second panel 70 for slidable reciprocating movement along the direction of axis 200. In the open position shown in FIG. 6, the third straight edge 103 of first panel 60 is aligned to overlap with edge 30a of rectangular aperture 28 shown in FIGS. 1 and 2. Similarly, in the open position shown in FIG. 6, the fourth straight edge 104 of the second panel 70 is aligned to overlap with edge 30b of rectangular aperture 28 shown in FIGS. 1 and 2. In the open position, none of the edges forming the aperture 62 of first panel 60 are visible, such edges forming the aperture 62 overlapping with the edges defining aperture 28 of the sheath 20 best shown in FIG. 1. Similarly, in the open position, none of the edges forming the aperture 72 of second panel 70 are visible, such edges being overlapping with the edges defining aperture 28 of the sheath 20 best shown in FIG. 3. Thus, in the open position, cropping window 100 is at its maximum size, overlapping with aperture 28 as defined by edges 101, 102, 30a, and 30b (as shown in FIG. 1). In the open position, the tabs 64 and 74 on first and second panels 60 and 70, respectively, extend beyond short edge 24a of sheath 20.

To operate the invention, the first and second panels 60 and 70 of the cropping device 10 are moved into the open position illustrated in FIG. 6. The cropping device 10 is placed on top of a photograph (or the like) with the photograph showing through the rectangular opening 28, which is also the maximum size of the cropping window 100 when the panels 60 and 70 are in the open position. The device is positioned on the photograph until the material to be cropped lies outside of the rectangular opening 28 and the material to be saved shows through the rectangular opening 28. If a smaller cropping window is desired, either tab 64 or 74 (or both) is grasped and pulled outward from the sheath 20 along the direction of axis 200 until the frictional force on the panel is overcome and the panel is moved towards a closed position.

As first panel 60 moves, edge 103 is displaced from its aligned condition with edge 30a and progressively crosses the rectangular opening 28. Throughout this motion, the edge 103 of panel 60 is maintained in a parallel alignment relative to second straight edge 102. The guide members 44a and 44b permit the panel 60 to move only along axis 200 and thus maintain the parallel relationship between edges 102 and 103.

Panel 70 operates similarly. As the second panel 70 moves, edge 104 is displaced from its aligned condition with edge 30b and progressively crosses the rectangular opening 28. Throughout this motion, the edge 104 of panel 70 is maintained in a parallel alignment relative to first straight edge 101. The guide members 46a and 46b permit the panel 70 to move only along axis 200 and thus maintain the parallel relationship between edges 101 and 104.

By operating the panels singly or simultaneously, a cropping window 100 of multiple sizes or proportions of right angle quadrilaterals can be produced up to the maximum dimensions of the rectangular opening 28. The middle sheet 34 separates first and second panels 60 and 70 so that movement of one will not result in movement of the other. The window size 100 is made larger, up to the size of the rectangular opening, by reversing the process.

As shown in FIGS. 1, the size of the cropping window 100 at any point is displayed by the scale 120 on exterior surface 32a of the sheet 32 of the sheath 20. A similar scale may be placed on exterior surface 36a if desired. As illustrated in FIG. 7, the scale 120 can display metric units 122 and/or English units 124. The scale 120 can be affixed to the exterior surface of the sheath using any conventional means, including but not limited to, stenciling or silk-screening. The cropping dimensions of window 100 can be transferred to the photograph at later time or the photograph can be marked in place using the window edges as a template.

Although the invention has been described with reference to a preferred embodiment, other embodiments can achieve the same results. For example, a sheath might be made without a third central sheet. Also a device using only a first or a second sheet with a panel or panels slideably secured thereto might also be used. Additionally, a device might be made where the panels slide at right angles to each other, and/or where outer edges of the panel, as opposed to apertures therein, operate to progressively close the window. Other variations and modifications of the present invention will be apparent to those skilled in the art and can be made without departing from the spirit and scope of the invention as defined by the appended claims.

What is claimed:

1. A device for defining a variable sized and proportioned window for use in cropping photographs, negatives, and the like, comprising:

a sheath comprising a first sheet having a first cut-out therein, a second sheet having a second cut-out therein, and a third sheet having a third cut-out therein, said first and said second sheets disposed on opposite sides of said third sheet to form a pair of adjacent clearances, a first long side forming a first channel member for connecting said first, second and third sheets, and a second long side forming a second channel member for connecting said first and second sheets, said channel members connecting said sheets and positioning said first, second, and third cut-outs to form a rectangular opening in said sheath having at least a first and a second straight edge intersecting at a right angle, and orienting at least one of said edges in a non-orthogonal relationship with said channels;

said first sheet having a first exterior surface with a first linear scale found thereon, and said second sheet having a second exterior surface with a second linear scale found thereon;

a first panel disposed in one said clearance and a second panel disposed in the other said adjacent clearance;

said first panel having at least one end with a tab extending therefrom, and further having an aperture therein with at least a third straight edge;

said second panel having at least one end with a tab extending therefrom, and further having an aperture therein with at least a fourth straight edge; and said channels operably connecting said sheath, said first panel, and said second panel to position said first straight edge parallel with said third straight edge and to position said second straight edge parallel with said fourth straight edge, and to further allow restricted, relative reciprocal movement between said sheath and said panels along a single axis parallel with said channel members such that said third edge is allowed to move towards and away from said first edge while being maintained in a parallel relationship with said first edge, and said fourth edge is allowed to move toward and away from said second edge while being maintained in a parallel relationship with said second edge, whereby said edges can be positioned relative to each other to form a variable sized right angle quadrilateral window, and whereby said device can be placed over a photograph, negative, or the like, with a portion of the same showing through the window, and said panels and sheets can be singly or simultaneously moved with respect to each other to selectively provide variable proportioned and sized right angle quadrilateral windows.

* * * * *